Figure 1:
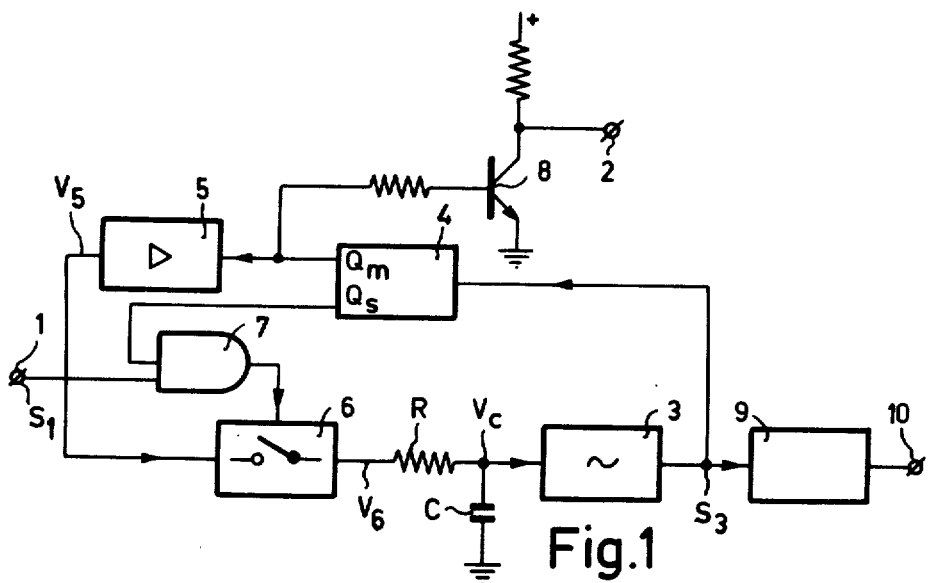

United States Patent

Cense et al.

[11] 4,024,343
[45] May 17, 1977

[54] CIRCUIT ARRANGEMENT FOR SYNCHRONIZING AN OUTPUT SIGNAL IN ACCORDANCE WITH A PERIODIC PULSATORY INPUT SIGNAL

[75] Inventors: Adriaan Cense; Jan Van Straaten, both of Nijmegen, Netherlands

[73] Assignee: U.S. Philips Corporation, New York, N.Y.

[22] Filed: May 7, 1975

[21] Appl. No.: 575,441

[30] Foreign Application Priority Data
May 27, 1974 Netherlands .................... 7407060

[52] U.S. Cl. .............................. 358/148; 331/18; 331/20
[51] Int. Cl.[2] .................... H04N 5/12; H03B 3/06
[58] Field of Search ....... 178/69.5 TV, 7.35, 7.3 R, 178/69.5 F, 69.5 R, 7.55; 329/50; 328/134, 63; 331/17, 18, 20; 307/269

[56] References Cited
UNITED STATES PATENTS

| | | | |
|---|---|---|---|
| 2,697,131 | 12/1954 | Baroch | 178/69.5 TV |
| 3,127,570 | 3/1964 | Smeulers | 331/20 |
| 3,567,857 | 3/1971 | Lynn | 178/7.35 |
| 3,567,861 | 3/1971 | Webb | 178/69.5 TV |
| 3,641,258 | 2/1972 | Steckler | 329/50 |
| 3,821,470 | 6/1974 | Merrell | 31/20 |
| 3,863,080 | 1/1975 | Steckler | 178/69.5 TV |
| 3,904,823 | 9/1975 | VanSstraaten | 178/7.35 |

Primary Examiner—John C. Martin
Attorney, Agent, or Firm—Frank R. Trifari; Henry I. Steckler

[57] ABSTRACT

Synchronizing circuit arrangement, for example for line synchronization in a television receiver, including digital means, the frequency of the oscillator being twice that of the signal to be synchronized. A frequency divider circuit, for example a master-slave flipflop, produces two output signals one of which serves as a reference signal for the phase discriminator whilest the other is applied together with the input signal of the circuit to a coincidence stage.

6 Claims, 2 Drawing Figures

CIRCUIT ARRANGEMENT FOR SYNCHRONIZING AN OUTPUT SIGNAL IN ACCORDANCE WITH A PERIODIC PULSATORY INPUT SIGNAL

The invention relates to a circuit arrangement for synchronizing an output signal in accordance with a periodic pulsatory input signal, comprising means for applying the input signal and a signal derived from the output signal to a coincidence stage, and comprising further a phase discriminator, a low-pass filter, an oscillator arranged to be controllable in frequency and in phase and a signal processing stage for applying a reference signal to the phase discriminator.

Such a circuit arrangement is described in U.S. Pat. No. 3,223,942. In the circuit arrangement described the input signal or part thereof is supplied by the coincidence stage to the phase discriminator whenever the said signal and the signal derived from the output signal to be synchronized occur at least partly simultaneously. The said step provides an extension of the lock-in range of the phase discriminator. The output voltage of the phase discriminator is smoothed by the low-pass filter, resulting in a control voltage for the oscillator.

The oscillator generates the output signal which after a certain lock-in time is synchronized in frequency and in phase with the input signal. From the output signal are derived the signal applied to the coincidence stage and also, via the signal processing stage, the reference signal for the phase discriminator. The latter signal is a voltage which is substantially linear function of time. In the phase discriminator the phase difference between this voltage and the output signal of the coincidence stage is measured and converted into a control voltage.

It is an object of the present invention to realize the known circuit arrangement by digital means so that the reliability and insensitivity to interference are increased and the circuit arrangement can readily be integrated in a semiconductor body. For this purpose the circuit arrangement according to the invention is characterized in that the frequency of the oscillator in the synchronized condition is twice that of the input signal and in that the signal processing stage consists of a frequency divider circuit in the form of a bistable element having two output terminals, the first output terminal being connected to the phase discriminator and the second output terminal being connected to the coincidence stage.

The circuit arrangement according to the invention may be used in a television receiver for synchronizing the line-frequency horizontal deflection. This provides the advantage that the signal generated by the oscillator can be divided by means of a frequency divider circuit by a divisor equal to the number of lines per picture so that a field-frequency signal is produced which can be used for vertical deflection.

Figure 2:
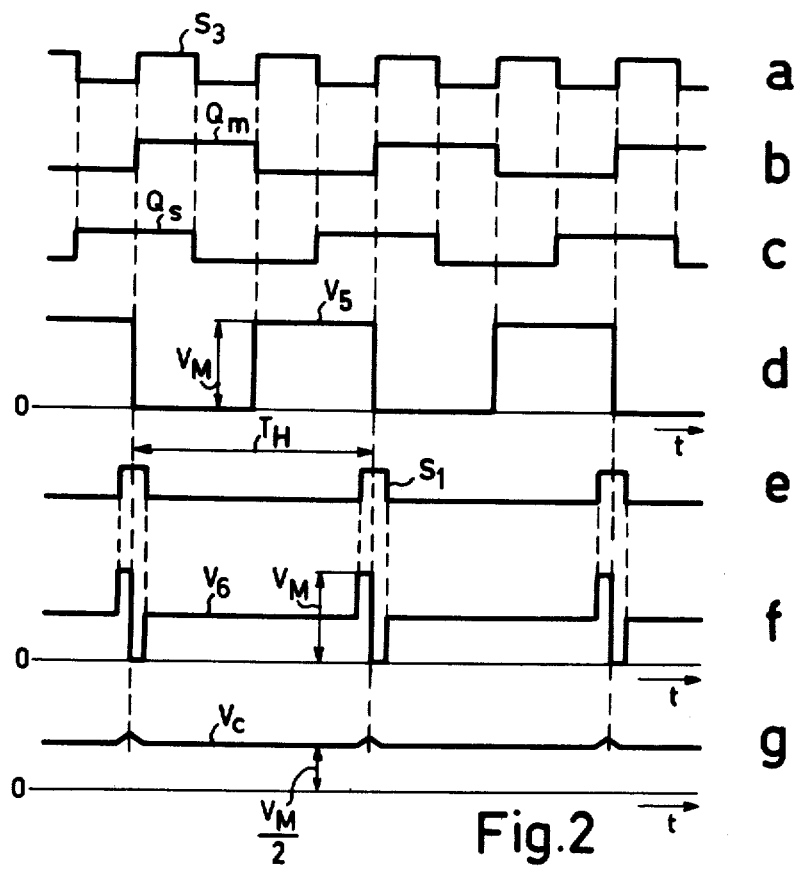

An embodiment of the invention will now be described, by way of example, with reference to the accompanying diagrammatic drawings, in which:

FIG. 1 is a schematic circuit diagram of a circuit arrangement according to the invention, and FIG. 2 shows waveforms which occur in this circuit.

Referring now to FIG. 1, reference numeral 1 denotes an input terminal to which a sequence of periodic pulses is applied. If the circuit arrangement according to the invention is used in a television receiver, the said pulses contain line synchronizing pulses at the line repetition frequency $f_H$, i.e. for example 15,625 Hz and 15,750 Hz according to the C.C.I.R. and the R.T.M.A. standards respectively. They are derived in known manner from the received signal in a synchronizing separator stage, not shown. At an output terminal 2 of the circuit pulses appear which have the frequency $f_H$ and the same phase as the pulses at the terminal 1. They are applied to an output stage, not shown, which supplies a line-frequency current to the deflection coil for horizontal deflection in the receiver.

The circuit arrangement of FIG. 1 includes an oscillator 3 which is controllable in frequency and in phase and which generates a signal the frequency of which in the synchronized condition is $2f_H$, i.e. twice that of the incoming line synchronizing pulses. The oscillator 3 may consist of bistable elements and its output signal $S_3$, which is shown by the waveform of FIG. 2a, is applied to a stage 4.

The stage 4 consists of a frequency divider circuit having two output signals which are relatively shifted in phase, as is shown in FIG. 2b and 2c. The signal at one output terminal $Q_m$ of the stage 4 passes to another level whenever an ascending edge occurs in the signal of FIG. 2a, whilst the signal at the other output terminal $Q_s$ of the stage 4 passes from one level to the other at the occurrence of the descending edges of the signal of FIG. 2a. If the latter signal is symmetrical, as is the case in FIG. 2a, the transistions of the signal of FIG. 2b and of that of FIG. 2c occur at the middles of the level parts of the signal of FIG. 2c and that of FIG. 2b respectively. The stage 4 is a binary divider circuit of known type, for example a master-slave flip flop.

The output terminal $Q_m$ is connected to an amplifier 5 capable of supplying a current which may be either positive or negative. This current charges and discharges respectively a capacitor C via a resistor R in the time interval in which a controllable switch 6 is conductive. The switch 6 can be rendered conducting by the output signal from an AND gate 7 one input terminal of which is connected to the output terminal $Q_s$ of the flipflop 4 and the other input terminal of which is connected to the terminal 1.

FIG. 2e shows the synchronizing signal $S_1$ applied to the terminal 1 in the condition of the circuit in which a synchronizing pulse occurs symmetrically with respect to the middle of the time interval in which the signal of FIG. 2c is "high". FIG. 2d represents the output voltage $V_5$ of the amplifier 5. This voltage is zero when the signal at the terminal $Q_m$ is "high", and it assumes a value $V_M$ when this signal is "low". In FIG. 2 the symbol $T_H$ denotes the line period.

Under these conditions the switch 6 is conductive. During the first half of the duration of a synchronizing pulse the capacitor C is charged by the voltage $V_M$, and during the second half it is discharged by the zero voltage. FIG. 2f is a waveform showing a voltage $V_6$ between the switch 6 and the resistor R. Owing to the integrating effect of the network R, C there is set up across the capacitor C a substantially constant voltage $V_C$ (FIG. 2g) which is equal to one half of the voltage $V_M$. This is the nominal value at which the oscillator 3 is adjusted to the nominal frequency and phase. One of the signals at the output of the stage 4, for example the signal at the terminal $Q_m$, controls the base of a transistor amplifier 8 the collector of which forms the output terminal 2 of the circuit. Because the stage 4 and the transistor 8 produce a negligible delay, the output signal at the terminal 2 has the same frequency and the same phase as the input signal at the terminal 1.

The signal $S_3$ available at the output terminal of the oscillator 3 can be applied to a further frequency divider circuit 9 by which its feequency $2f_H$ is divided by the number of lines in each picture in teh relevant standard, for example 625 and 525 respectively. Thus at the ouput terminal 10 of the divider circuit 9 a field-frequency signal of, for example, 50 Hz and 60 Hz respectively is produced the phase of which still is to be compared to the received field synchronizing signal. Such field synchronizing circuits are known and are described, for example, in U.S. Pat. No. 3,904,823.

If there is a phase difference between the waveforms of FIG. 2d and FIG. 2e the voltage $V_C$ will assume a constant value which differs from $V_M/2$ and may lie between 0 and $V_M$. As a result the oscillator 3 will be adjusted until the correct phase, i.e. the phase shown in FIG. 2, is obtained. From the foregoing it will be seen that the switch 6, as well as resistor R, and capacitor C, behave as a phase discriminator the maximum output voltage of which is determined by the amplitude of the output voltage $V_s$ of the amplifier 5. Thus the voltage $V_s$ is the reference voltage for the phase discriminator. It can be shown that the control voltage $V_C$ is a substantially linear function of the phase difference between the synchronizing signal and the reference voltage.

If, for example during lock-in, the frequency of the signal $S_3$ differs from the value $2f_H$, the difference in phase between the signals $S_1$ and $S_3$ varies continuously. The voltage $V_C$ varies periodically between 0 and $V_M$ until the signal $S_3$ has the correct frequency, whereupon the described phase lock-in process takes place.

Because the signal $Q_s$ has a gating effect, the circuit is less sensitive to noise and interference which may be superposed on the signal $S_1$. However, the signal $S_1$ may contain equalising pulses at the frequency $2f_H$ which occur before and after the frame synchronizing pulses. If the circuit locks in to an equalising pulse, subsequent line synchronizing pulses may be gated away by the signal $Q_s$. This is undesirable. A step for removing this effect is proposed in our co-pending U.S. patent application Ser. No. 575,442, filed May 7, 1975, now U.S. Pat. No. 3,991,270.

Although the embodiment described relates to a circuit arrangement used in a television receiver, it will be obvious that the step according to the invention need not be restricted thereto.

What is claimed is:

1. Circuit arrangement for synchronizing an output signal in accordance with a periodic pulsatory input signal, comprising a coincidence stage having a first input means for receiving the input signal, a second input, and an output, a phase discriminator coupled to said output and including a low-pass filter, an oscillator coupled to said filter and controllable in frequency and in phase, the frequency of the oscillator in the synchronized condition being twice that of the input signal, a frequency divider circuit comprising a bistable element coupled to said oscillator and having two output terminals, a transition in the signal at an output terminal of the frequency divider circuit occuring within each time interval in which there is no transition in the signal at the other output terminal, the first output terminal being coupled to the phase discriminator and the second ouput terminal being coupled to the coincidence stage second input.

2. Circuit arrangement as claimed in claim 1, wherein the bistable element comprises a master-slave flipflop which divides the frequency of the signal applied to it by two.

3. Circuit arrangement as claimed in claim 1, wherein the output signal of the circuit comprise a signal output terminal of the frequency divider circuit.

4. Circuit arrangement as claimed in claim 1, wherein the phase discriminator comprises a controllable switch which is rendered conductive whenever the input signal and the signal at the second output terminal of the frequency divider circuit occur at least partly simultaneously.

5. Circuit arrangement as claimed in claim 4, wherein at least the oscillator, the frequency divider circuit, the coincidence stage and the controllable switch are binary elements in monolithic integrated-circuit form.

6. Circuit arrangement as claimed in claim 1 for use in a television receiver, the input signal including line synchronizing pulses, said circuit further comprising a further frequency divider circuit means coupled to said oscillator for dividing the frequency by a divisor equal to the number of lines per picture.

* * * * *